US010151352B2

(12) United States Patent
Creek et al.

(10) Patent No.: US 10,151,352 B2
(45) Date of Patent: Dec. 11, 2018

(54) SHAFT RETENTION APPARATUS

(71) Applicant: GM GLOBAL TECHNOLOGY OPERATIONS LLC, Detroit, MI (US)

(72) Inventors: Steven W. Creek, Shelby Township, MI (US); Christopher M. Jones, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 14/946,835

(22) Filed: Nov. 20, 2015

(65) Prior Publication Data

US 2017/0146070 A1 May 25, 2017

(51) Int. Cl.
  F16B 21/18 (2006.01)
  F16D 1/116 (2006.01)
  F16D 1/10 (2006.01)
  F16D 3/223 (2011.01)

(52) U.S. Cl.
  CPC ............ F16D 1/116 (2013.01); F16B 21/186 (2013.01); *F16D 2001/103* (2013.01); *F16D 2003/22323* (2013.01); *Y10T 403/587* (2015.01); *Y10T 403/7033* (2015.01)

(58) Field of Classification Search
  CPC .......... F16B 7/0426; F16B 2/24; F16B 2/245; F16B 7/048; F16B 21/18; F16B 21/186; F16D 1/04; F16D 1/08; F16D 1/116; F16D 2001/103; F16D 1/0894; F16D 1/108; Y10T 403/587; Y10T 403/7033; Y10T 403/7171; Y10T 403/7026; Y10T 403/7028; Y10T 403/7031; Y10T 403/7032; Y10T 403/7035; Y10T 403/7176; Y10S 464/904–464/906

USPC ...... 464/182, 904–906; 403/319, 359.5, 396, 403/359.1–359.4, 359.6, 397
See application file for complete search history.

(56) References Cited

U.S. PATENT DOCUMENTS 2,029,051 A * 1/1936 Blevins .............. A47G 23/0241
  215/395
2,720,633 A * 10/1955 Westberg ........... H01R 13/6392
  439/369

(Continued)

FOREIGN PATENT DOCUMENTS

DE  102009020981 A1 * 11/2010 ............. B60K 17/22
FR      2808310 A1 * 11/2001 ............ F16B 7/0426

OTHER PUBLICATIONS

"Clip." Google.com. [online], [retrieved on Oct. 16, 2017]. Retrieved from the Internet <URL: https://www.google.com/search?q=define%3A+clip>.*

Primary Examiner — Josh Skroupa
(74) Attorney, Agent, or Firm — Cantor Colburn LLP

(57) ABSTRACT

A vehicle drive system comprises a first shaft and a second shaft that includes an opening configured to receive the first shaft. A shaft retention apparatus comprises a support component extending axially and along the outer contour of the outer surface of the first shaft and the outer surface of the second shaft, to bridge the two shafts at an intersection thereof. A first clip portion extends from the support component and engages a groove in the outer surface of first shaft and a second axially spaced clip portion extends from the support component and engages a groove in the outer surface of the second shaft, preventing prevent axial movement therebetween.

7 Claims, 4 Drawing Sheets

(56) References Cited

U.S. PATENT DOCUMENTS

| | | | | |
|---|---|---|---|---|
| 4,120,073 A * | 10/1978 | Studebaker | ........ | A47G 23/0266 |
| | | | | 16/425 |
| 4,333,505 A * | 6/1982 | Jones | ........................ | A61J 1/05 |
| | | | | 141/383 |
| 4,723,801 A * | 2/1988 | Musumeci | ............ | A61J 9/0623 |
| | | | | 248/102 |
| 4,741,590 A * | 5/1988 | Caron | ................... | G02B 6/3825 |
| | | | | 385/60 |
| 4,813,808 A * | 3/1989 | Gehrke | ................... | F16B 21/16 |
| | | | | 403/359.5 |
| D353,578 S * | 12/1994 | Johnson | ....................... | D13/154 |
| 6,322,306 B1 * | 11/2001 | Dutton | ................... | F16B 2/245 |
| | | | | 411/120 |
| 6,428,236 B2 * | 8/2002 | Aota | ........................ | F16C 3/03 |
| | | | | 403/359.5 |
| 6,612,619 B2 * | 9/2003 | Wieder | ................... | F16L 37/00 |
| | | | | 285/114 |
| 6,846,023 B2 * | 1/2005 | Ebinger | .............. | F16L 37/1225 |
| | | | | 24/563 |
| D510,257 S * | 10/2005 | Marty | ........................... | D8/356 |
| 6,979,031 B2 * | 12/2005 | Coppotelli | ......... | A47G 23/0258 |
| | | | | 16/425 |
| 8,425,142 B2 * | 4/2013 | Disser | ................... | F16D 1/116 |
| | | | | 403/359.5 |
| D730,721 S * | 6/2015 | Degan | ........................... | D8/356 |
| D755,727 S * | 5/2016 | Estes | .......................... | D13/154 |
| 9,383,050 B1 * | 7/2016 | Home | ................ | F16L 37/1225 |

* cited by examiner

SHAFT RETENTION APPARATUS

FIELD OF THE INVENTION

Exemplary embodiments of the invention are directed to rotational shafts and their couplings and, more particularly to an apparatus for connecting rotationally driven propshafts.

BACKGROUND

Rotational power sources are common across industries, and rotating shafts are commonly used to transfer rotational power. In vehicular applications drive shafts and prop shafts are used to transfer rotational power from a rotational source that is typically an internal combustion ("IC") engine to various sets of road wheels through a drive train. The drive train may comprise numerous moveable joints and the like that require connections between shafts. The connections must be reliable, robust, and cost effective. Flanged connections are complex and expensive. Snap rings require machining of inner diameters and lack a visual confirmation that the connection has been made.

SUMMARY OF THE INVENTION

In an exemplary embodiment a vehicle drive system comprises a first shaft, a second shaft that includes an opening configured to receive the first shaft therein, a shaft retention apparatus comprising, a support component extending axially and along the outer contour of the outer surface of the first shaft and the outer surface of the second shaft to bridge the two shafts at an intersection thereof, a first clip portion extending from the support component and configured to engage a groove in the outer surface of first shaft and a second axially spaced clip portion extending from the support component and configured to engage a groove in the outer surface of the second shaft to prevent axial movement therebetween.

In another exemplary embodiment a vehicle drive system comprises a first shaft having a groove in an outer surface, a second shaft including an opening configured to receive the first shaft therein and having a groove formed in the outer surface defining a through passage that extends through an inner surface of the opening and a shaft retention apparatus comprising a clip configured in an arcuate configuration. The circumference of the clip is configured for disposition in the groove in the second shaft and the clip extending radially inwardly to engage the groove formed in the first shaft, via the through passage, to thereby prevent axial movement between the two shafts.

In yet another exemplary embodiment a joint having rotatable shafts comprising a first shaft, a second shaft including an opening configured to receive the first shaft therein and a shaft retention apparatus comprising a support component extending axially and along the outer contour of the outer surface of the first shaft and the outer surface of the second shaft to thereby bridge the two shafts at an intersection thereof, a first clip portion extending from the support component and configured to engage a groove in the outer surface of first shaft, and a second axially spaced clip portion extending from the support component and configured to engage a groove in the outer surface of the second shaft to prevent axial movement therebetween.

The above features and advantages, and other features and advantages of the invention are readily apparent from the following detailed description for carrying out the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
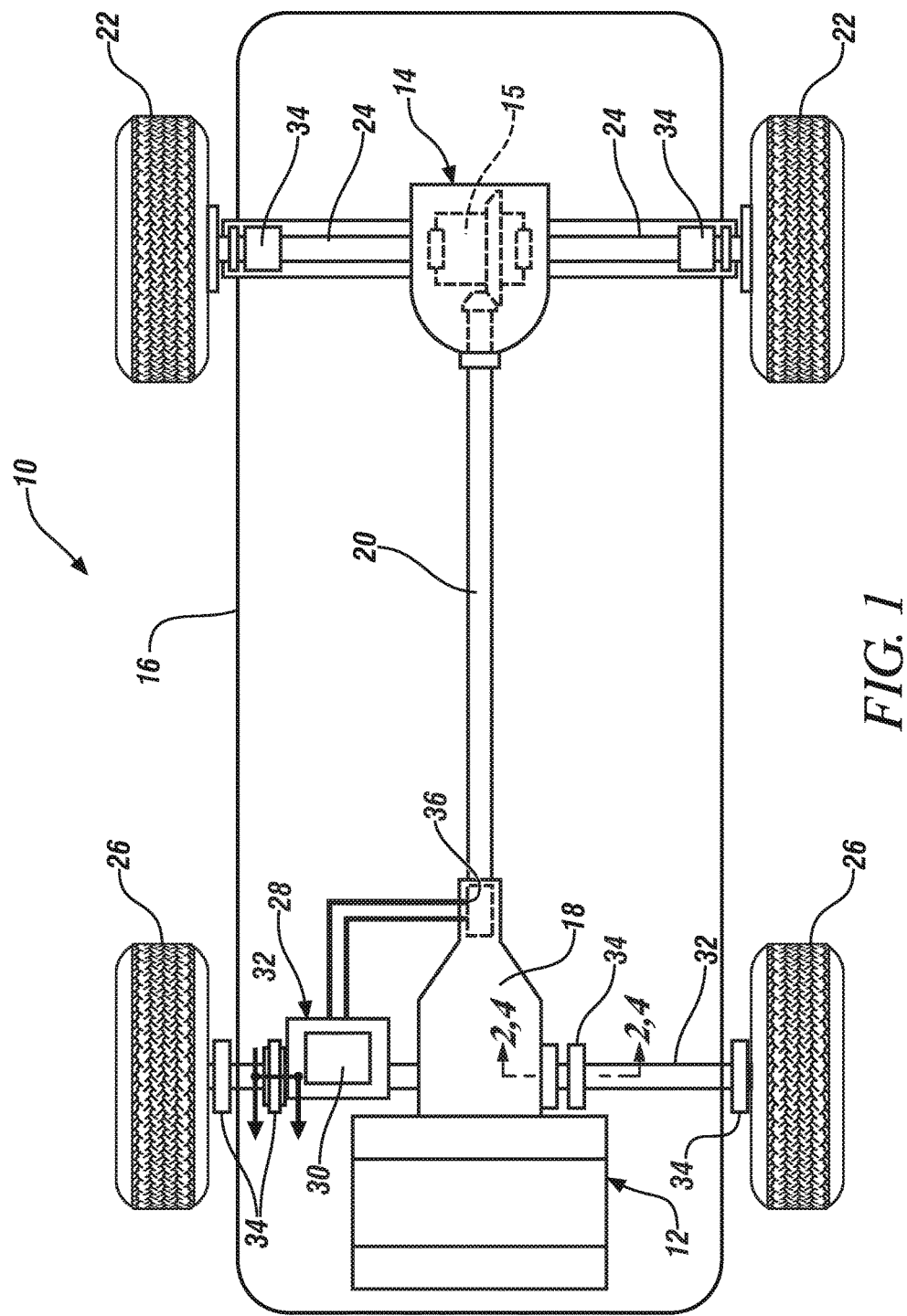
FIG. 1 is a schematic plan view of a vehicle having a drive system embodying features of the invention.

The following description is merely exemplary in nature and is not intended to limit the present disclosure, its application or uses. It should be understood that throughout the drawings, corresponding reference numerals indicate like or corresponding parts and features. As used herein the term "vehicle" is not limited to just an automobile, truck, van or sport utility vehicle, but includes any self-propelled or towed conveyance suitable for transporting a burden.

Referring to FIG. 1, in an exemplary embodiment, a vehicle 10 may include an engine 12, such as a gasoline or diesel fueled internal combustion ("IC") engine, for example. The engine 12 may further be a hybrid-type engine that combines an internal combustion engine with an electric motor, for example. The vehicle 10 may also include a differential assembly 14. In the embodiment illustrated, the differential assembly is located in the rear of vehicle 10 and may be referred to as a rear drive module while the engine 12 is located towards the front of the vehicle. The engine 12 and the differential assembly 14 are coupled to a frame or other chassis structure 16. The engine 12 is coupled to the differential assembly 14 through a transmission 18 and a drive shaft 20. The transmission 18 is configured to reduce the rotational velocity and increase the torque of the engine output. The modified output is then transmitted to the differential assembly 14 via the drive shaft 20. The rear differential assembly 14 transmits the output torque from the drive shaft 20, through a differential gear set 15 (not shown) to a pair of driven wheels 22 via axles 24. The coupling of rotational components such as the driveshaft to the transmission 18 and the rear differential assembly 14, and the rear differential assembly to the axles 24 may be accomplished using a spline connection, for instance. In each case, however, a retaining apparatus is used to assure that the rotational components remain in a fixed position relative to one another.

The vehicle 10 further includes a second set of wheels 26 arranged towards the front of the vehicle adjacent the engine 12. In one embodiment, the second set of wheels 26 is also configured to receive rotational output from the engine. This may be referred to as a four-wheel or all-wheel drive configuration. In this embodiment the vehicle 10 may include a transfer case 28 that divides or partitions the output from a power take-off 36 at transmission 18. The transfer case 28 transmits a portion of the output to a front differential assembly 30, which may include additional components such as a differential gear set (not shown) and axles or prop-shafts 32 that transmit the output to the second set of wheels 26.

In embodiments, prop-shafts 32 extend between the front differential assembly 30 and the driven wheels 26, and may include constant velocity ("CV") joints 34 at each end thereof. The operation of CV joints is well understood such that further description is not necessary for the purposes of this disclosure. The CV joints 34 are typically located to allow out-of-axis movement of the prop-shafts during rotation. The location of a CV joint 34, into the drive system, will necessitate a shaft-to-shaft connection.

Figure 2:
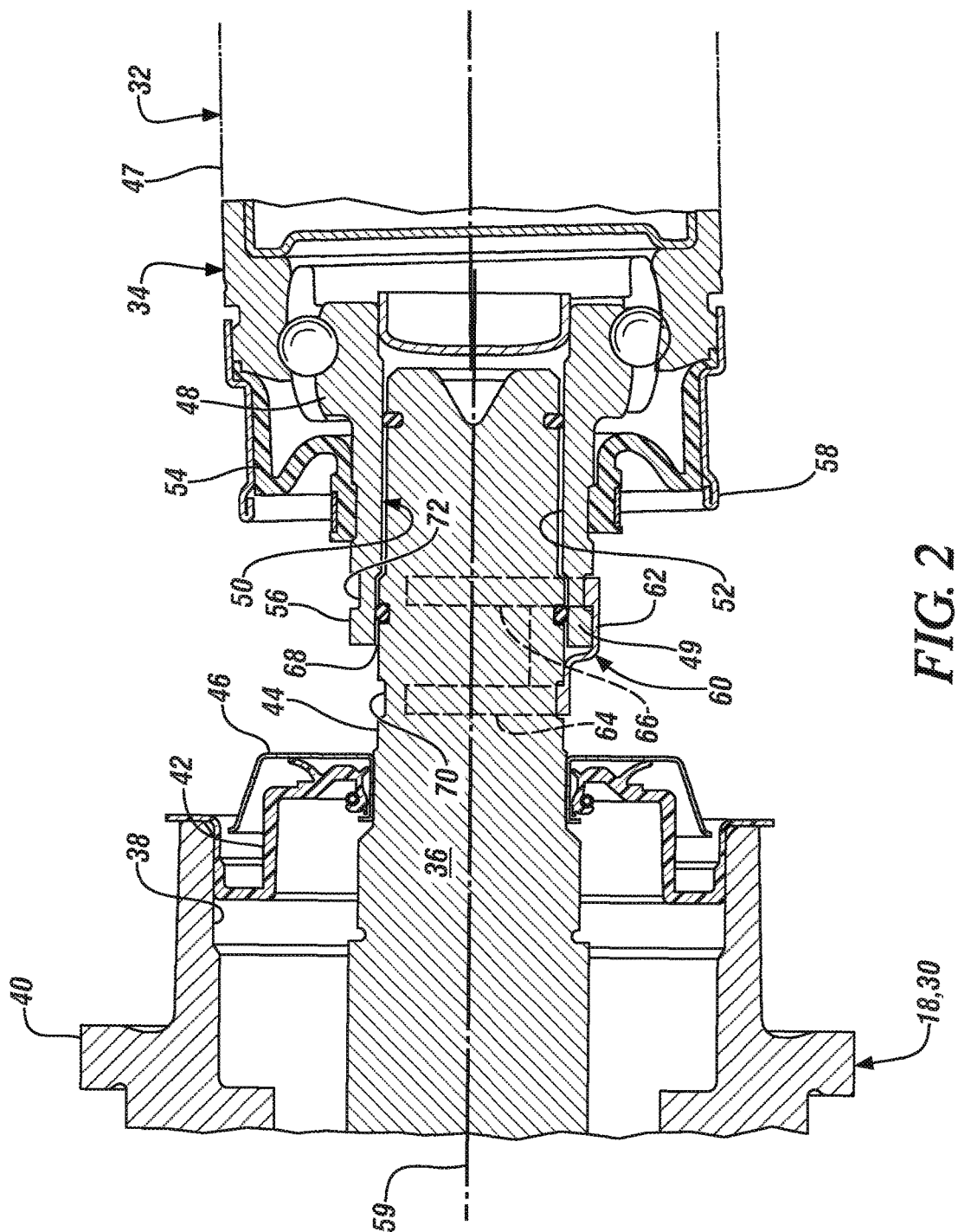
FIG. 2 is a sectional view taken along line 2-2 of FIG. 1.
Figure 3:
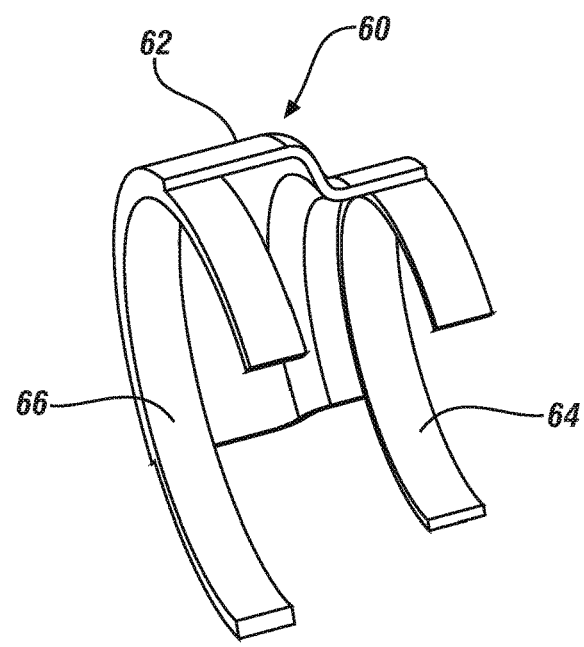
FIG. 3 is an isometric view of a shaft retention apparatus embodying features of the invention.

Referring now to FIG. 2, in an exemplary embodiment, a first or output shaft 36 of a differential assembly 30 or a transmission 18, for example, is illustrated. The output shaft extends from an opening 38 in the housing 40 of the differential assembly 30 or a transmission 18 and is sealed via a flexible rubber boot 42 that closes around the outer surface 44 of the shaft. In an embodiment, a shield 46 is located outboard of the rubber boot 42 to protect the boot from impact damage, for instance. A CV joint 34 is mounted to an end 47 of a prop-shaft 32 and includes an inner joint 48 defining a second shaft 49 that includes an opening 50 configured to receive the output shaft 36 therein. The inner surface 52 of the opening 50 and the outer surface 44 of the output shaft 36 may be splined or keyed to prevent relative rotation of the components during rotation. The CV joint 34 may be sealed via a flexible boot 54 that closes around the outer surface 56 of the CV inner joint 48. In an embodiment, a shield 58 is located outboard of the rubber boot 54 to protect the boot from impact damage, for instance. In order to prevent axial movement of the first, output shaft 36 relative to the second shaft 49 along axis 59 a shaft retention apparatus 60, FIGS. 2 and 3, is installed therebetween.

The shaft retention apparatus 60 comprises, in an embodiment, a support component 62 and first and second axially spaced clip portions 64 and 66 extending therefrom. The support component extends axially and closely matches the outer contour of the outer surface 44 of the output shaft 36 as well as the outer surface 56 of the second shaft 49 defined by the CV inner joint 48. The first clip portion 64 is configured in an arcuate manner, and is configured to engage a groove 70 formed or machined in the outer surface 44 of output shaft 36. Similarly the second clip portion 66 is also configured in an arcuate manner, and is configured to engage a groove 72 formed or machined in the outer surface 56 of second shaft 49. With the first and second axially spaced clip portions 64 and 66 installed about the first and second shafts as described, the support component 62 is configured to bridge the two shafts at their intersection 68 thereby preventing axial movement therebetween.

Other embodiments of the shaft retention apparatus 60 described thus far may include additional support components 62 extending between the first and second axially spaced clip portions 64 and 66 for increased strength and rigidity. In addition it may be desirable to provide additional clip portions 64, 66 to the ends of the apparatus to engage additional grooves 70, 72 for the purposes of redundancy. It is contemplated the shaft retention apparatus may be constructed from spring steel, composite or any other material that is suitable for the application.

Figure 5:
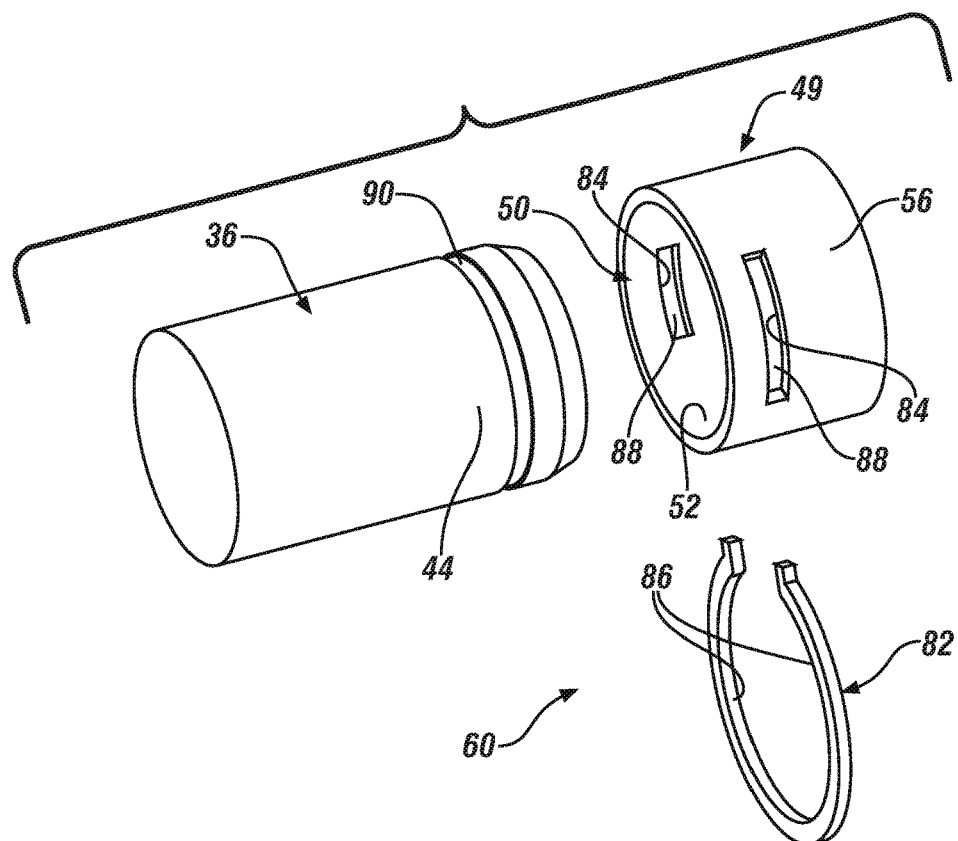
FIG. 5 is an isometric view of another embodiment of a shaft retention apparatus embodying features of the invention.
Figure 4:
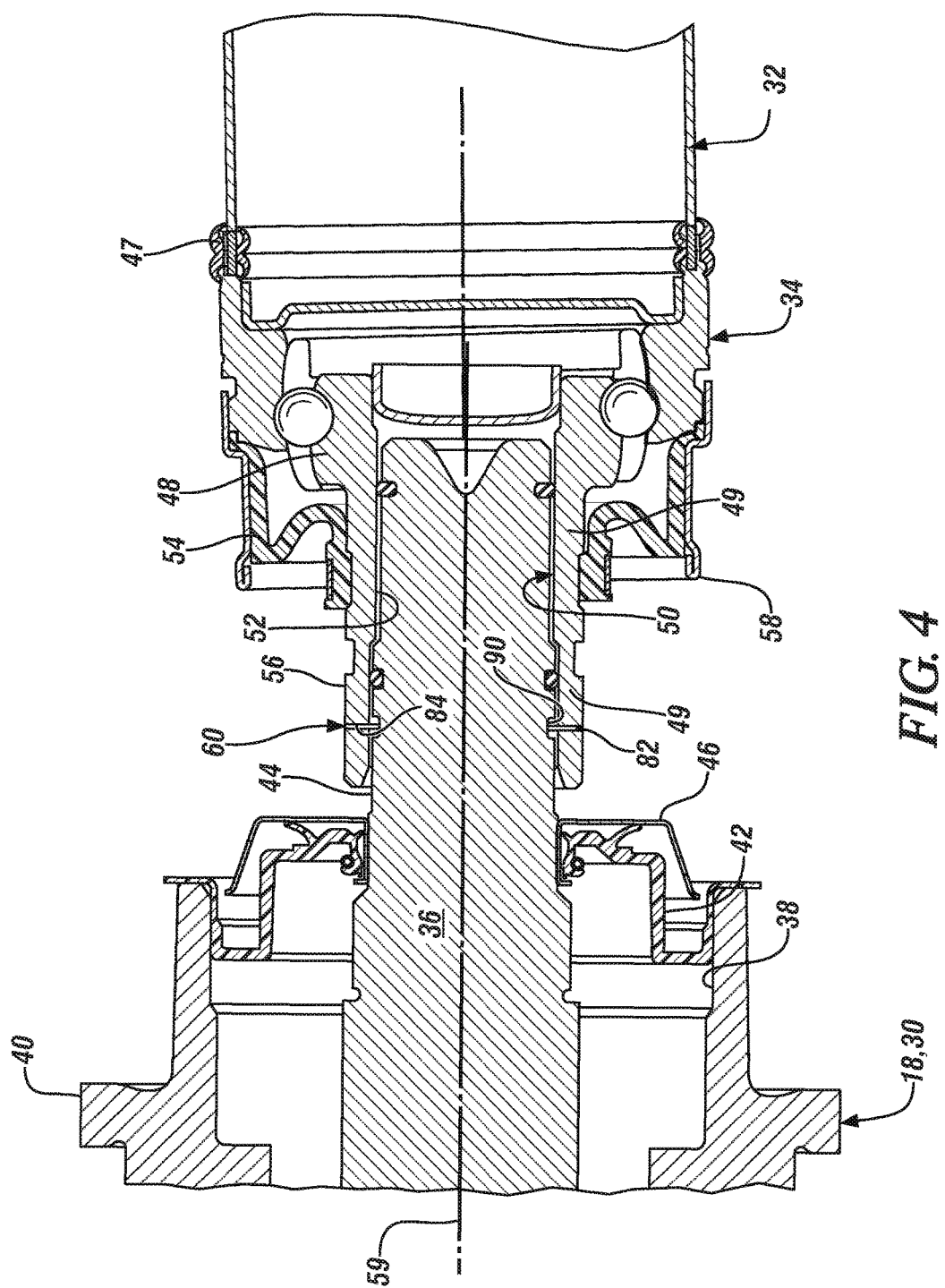
FIG. 4. is a sectional view taken along line 4-4 of FIG. 1, illustrating an alternative embodiment of the invention.

Referring now to FIGS. 4 and 5, in another embodiment of the invention, a first or output shaft 36 of a differential assembly 30 or a transmission 18, for example, is illustrated. The output shaft extends from an opening 38 in the housing 40 of the differential assembly 30 or a transmission 18 and is sealed via a flexible rubber boot 42 that closes around the outer surface 44 of the shaft. In an embodiment, a shield 46 is located outboard of the rubber boot 42 to protect the boot from impact damage, for instance. A CV joint 34 is mounted to an end 47 of a prop-shaft 32 and includes an inner joint 48 defining a second shaft 49 that includes an opening 50 configured to receive the output shaft 36 therein. The inner surface 52 of the opening 50 and the outer surface 44 of the output shaft 36 may be splined or keyed to prevent relative rotation of the components during rotation. The CV joint 34 may be sealed via a flexible rubber boot 54 that closes around the outer surface 56 of the CV inner joint 48. In an embodiment, a shield 58 is located outboard of the rubber boot 54 to protect the boot from impact damage, for instance. In order to prevent axial movement of the first, output shaft 36 relative to the second shaft 49 along axis 59 a shaft retention apparatus 60 is installed.

The shaft retention apparatus 60 comprises clip 82 configured in an arcuate manner. The circumference of the clip is configured to engage through-slots 84 formed in the outer surface 56 of the second shaft 49. Clip arms 86 of the clip 82 extend radially inwardly through passages 88 defined by through-slots 84 to engage groove 90 formed in the outer surface 44 of the first output shaft 36 to thereby preventing axial movement between the two shafts. The groove 84 and the groove 90 are located axially along their respective shafts 49 and 36 such that they are in radial alignment when the first or output shaft 36 is inserted into the second shaft 49. It is contemplated the shaft retention apparatus 60 may be constructed from spring steel, composite or any other material that is suitable for the application. In addition the clip 82 may comprise any width that allows it to seat securely with its corresponding groove 84.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A vehicle drive system comprising:
   a first shaft having a first outer surface including a first outer contour;
   a second shaft that includes an opening configured to receive the first shaft therein, the second shaft including a second outer surface including a second outer contour that is distinct from the first outer contour;
   a shaft retention apparatus comprising:
   a support component extending axially and along the first outer surface and the second outer surface to bridge the first shaft and the second shaft at an intersection thereof, the support component including a third contour that substantially matches the first outer contour and the second outer contour;
   a first clip portion extending from the support component and configured to engage a groove in the first outer surface of first shaft, the first clip portion including a first end, a second end and an intermediate portion flexibly connecting the first end the second end, the first end being spaced from the second end to define a first discontinuity; and a second, axially spaced clip portion extending from the support component and configured to engage a groove in the second outer surface of the second shaft to prevent axial movement between the first shaft and the second shaft, the second, axially spaced clip portion including a first end portion, a second end portion and an intermediate portion flexibly connecting the first end portion and the second end portion, the first end portion being spaced from the second end portion to define a second discontinuity.

2. The vehicle drive system of claim 1, the second shaft further comprising a prop-shaft having a CV joint mounted to an end thereof, the CV joint having an inner joint defining the second shaft.

3. The vehicle drive system of claim 1, wherein the first and second clip portions have an arcuate configuration.

4. The vehicle drive system of claim 1, wherein an inner surface of the opening of the second shaft and an outer surface of the first or output shaft are splined or keyed to prevent relative rotation during rotation.

5. The vehicle drive system of claim 1, wherein the first and second clip portions extend from ends of the support component.

6. The vehicle drive system of claim 1, wherein the shaft retention apparatus is constructed from one of spring steel or composite.

7. A joint having rotatable shafts comprising:
a first shaft having a first outer surface including a first outer contour;
a second shaft including an opening configured to receive the first shaft therein, the second shaft including a second outer surface including a second outer contour that is distinct from the first outer contour; and
a shaft retention apparatus comprising:
a support component extending axially and along the first outer surface and the second outer surface to bridge the first shaft and the second shaft at an intersection thereof, the support component including a third contour that substantially matches the first outer contour and the second outer contour;
a first clip portion extending from the support component and configured to engage a groove in the first outer surface of first shaft, the first clip portion including a first end, a second end and an intermediate portion flexibly connecting the first end and the second end; and
a second axially spaced clip portion extending from the support component and configured to engage a groove in the second outer surface of the second shaft, to prevent axial movement therebetween, the second axially spaced clip portion including a first end portion, a second end portion and an intermediate portion flexibly connecting the first end portion and the second end portion.

* * * * *